(12) United States Patent
Chin et al.

(10) Patent No.: US 8,415,416 B2
(45) Date of Patent: Apr. 9, 2013

(54) ELECTRET MATERIALS

(75) Inventors: Hui Chin, Springfield, VA (US); Andrew Joseph Leggio, Las Vegas, NV (US); Matthew Edward Gande, Norwalk, CT (US); Anthony David Debellis, Stony Point, NY (US); Sai Ping Shum, Pleasantville, NY (US); Per Magnus Kristiansen, Zürich (CH); Klaus Stoll, Binzen (DE); Hans-Werner Schmidt, Bayreuth (DE); Nils Mohmeyer, Osnabrück (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/611,784

(22) Filed: Sep. 12, 2012

(65) Prior Publication Data

US 2013/0012091 A1    Jan. 10, 2013

Related U.S. Application Data

(63) Continuation of application No. 13/431,099, filed on Mar. 27, 2012, now abandoned, which is a continuation of application No. 13/151,732, filed on Jun. 2, 2011, now abandoned, which is a continuation of application No. 12/079,605, filed on Mar. 27, 2008, now abandoned.

(60) Provisional application No. 60/928,610, filed on May 10, 2007, provisional application No. 60/922,024, filed on Apr. 5, 2007.

(51) Int. Cl.
    *C07F 9/40*     (2006.01)

(52) U.S. Cl.
    USPC ............ 524/131; 524/132; 524/226; 524/236

(58) Field of Classification Search .................. 524/226, 524/131, 132, 236
    See application file for complete search history.

(56) References Cited

U.S. PATENT DOCUMENTS

| | | | |
|---|---|---|---|
| 4,874,399 | A | 10/1989 | Reed et al. |
| 5,057,710 | A | 10/1991 | Nishiura et al. |
| 5,556,618 | A | 9/1996 | Ando et al. |
| 6,123,752 | A | 9/2000 | Wu et al. |
| 6,743,464 | B1 | 6/2004 | Insley et al. |
| 6,969,484 | B2 | 11/2005 | Horiguchi et al. |
| 2004/0023577 | A1 | 2/2004 | Horiguchi et al. |
| 2005/0203226 | A1 | 9/2005 | Mader et al. |
| 2007/0149663 | A1 | 6/2007 | Schmidt et al. |

FOREIGN PATENT DOCUMENTS

| | | |
|---|---|---|
| EP | 0325854 | 8/1989 |
| EP | 1403418 | 3/2004 |
| WO | 03102069 | 11/2003 |
| WO | 2007115963 | 10/2007 |

OTHER PUBLICATIONS

Mohmeyer et al., Polymer, vol. 48, (2007), pp. 1612-1619.

*Primary Examiner* — Peter D Mulcahy
(74) *Attorney, Agent, or Firm* — Tyler A. Stevenson

(57) ABSTRACT

Disclosed are electret materials with outstanding thermal and charge stability. The electret materials comprise a melt blend of a thermoplastic polymer and one or more compounds selected from the aromatic trisamides. The aromatic trisamides are for example of the formula

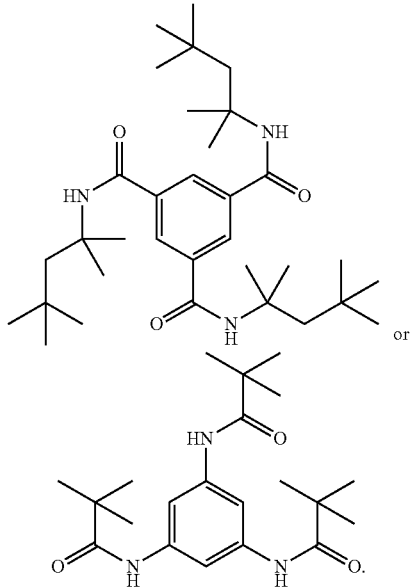

The melt blends are subjected to an electret treatment, for example a corona treatment. The electret materials are for example nonwoven polyolefin webs and are employed as filter materials, wipes, absorbent materials, filter masks, acoustic materials, printing substrates, measuring devices or contactless switches. The present electret materials may also comprise a further additive selected from the hindered amine light stabilizers and the hydroxyphenylalkylphosphonic esters or monoesters.

22 Claims, No Drawings

ELECTRET MATERIALS

This application is a continuation of U.S. application Ser. No. 13/431,099, filed Mar. 27, 2012, now abandoned, which is a continuation of Ser. No. 13/151,732, filed Jun. 2, 2011, abandoned, which is a continuation of U.S. application Ser. No. 12/079,605, filed Mar. 27, 2008, abandoned, which claims benefit of U.S. provisional application Nos. 60/928,610, filed May 10, 2007 and 60/922,024, filed Apr. 5, 2007, the contents of which are incorporated herein by reference.

The present invention is aimed at electret materials having excellent thermal stability and charge stability. The electret materials are for example polyolefin fibers or films and are suitably employed as filter materials, wipes, absorbent materials, filter masks, acoustic materials, printing substrates, measuring devices or contactless switches.

BACKGROUND

U.S. Pat. No. 5,057,710 teaches electret materials comprising hindered amines, nitrogen containing hindered phenols or metal-containing hindered phenols.

U.S. Pat. No. 5,556,618 discloses antibacterial electret materials.

U.S. Pat. No. 6,123,752 teaches high efficiency filter medium containing a performance enhancing additive.

U.S. Pat. No. 6,743,464 teaches a method of making electrets through vapor condensation.

U.S. Pat. No. 6,969,484 discloses a method of making electret.

U.S. patent app. No. 60/791,047, filed Apr. 11, 2006, teaches electret materials comprising certain additives.

U.S. published app. No. 2005/0203226 and WO 2004/072168 teach trisamide nucleating agents.

Mohmeyer, et al., in Polymer, 48 (2007), 1612-1619, discusses electret materials.

SUMMARY

Disclosed is an electret material with enhanced thermal and charge stability, which material has been subjected to an electret treatment, comprising
a thermoplastic polymer and
incorporated therein, an effective stabilizing amount of one or more aromatic trisamide compounds.

Also disclosed is a method for preparing an electret material with enhanced thermal and charge stability, which method comprises
melt blending a thermoplastic polymer with an effective stabilizing amount of one or more aromatic trisamide compounds and
subjecting the blend to an electret treatment.

DETAILED DISCLOSURE

The thermoplastic polymer is a non-conductive polymer that has the capability of possessing a non-transitory or long-lived trapped charge. The polymer is for example a polyolefin, a halogenated vinyl polymer (e.g. polyvinyl chloride), polystyrene, polycarbonate, a polyester (e.g. polyethylene terephthalate), a polyamide or a fluoropolymer (e.g. polytetrafluoroethylene).

The thermoplastic polymers are for example propylene homopolymers, propylene copolymers and polypropylene blends. Propylene copolymers may contain various proportions up to 90%, preferably up to 50%, of comonomers. Examples of comonomers are: olefins such as 1-olefins, e.g. ethylene, 1-butene, 1-pentene, 1-hexene, 1-heptene or 1-octene, isobutylene, cycloolefins, e.g. cyclopentene, cyclohexene, norbornene or ethylidenenorborne, dienes such as butadiene, isoprene, 1,4-hexadiene, cyclopentadiene, dicyclopentadiene or norbornadiene; also acrylic acid derivatives and unsaturated carboxylic anhydrides such as maleic anhydride.

Polypropylene blends which can be used are mixtures of polypropylene with polyolefins. Examples are blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

The polymer is especially a polyolefin, for example polypropylene, poly(4-methyl-1-pentene) or linear low density polyethylene, or blends or copolymers thereof. The polymer may be a blend of a polyolefin and a polymer that contains polar groups, for example a polyester or a polyamide.

Polypropylene includes for instance reactor (such as metallocene) and visbroken (e.g. peroxides, hydroxylamine esters, thermally broken, etc.) grades.

The electret material comprising the thermoplastic material is in the form of a nonwoven web, a film, or a woven fabric. The electret material is in particular a nonwoven fibrous web.

The thermoplastic polymer may also be for example polyurethane or a polyester such as polylactic acid. The polyurethane may for example be in the form of a foam.

In addition to thermoplastic fibers, the electret material may be a natural fiber such as cotton.

The electret treatment may be any known treatment. Electret treatments are taught for example in U.S. Pat. Nos. 5,057,710, 5,556,618, 6,123,752, 6,743,464, 6,969,484, 6,284,339, 5,256,176 and 6,926,961, the disclosures of which are hereby incorporated by reference. The electret treatment is for example hydro-charging, tribo-electric charging or corona treatment. The electret treatment is especially a corona treatment.

An electret material according to this invention is a thermoplastic material that has been subjected to an electret treatment.

The aromatic trisamide compounds are taught for example in U.S. published app. No. 2005/0203226 and U.S. application Ser. No. 10/544,508, published as WO 2004/072168, the contents of which are hereby incorporated by reference.

The aromatic trisamides are for instance of formula I

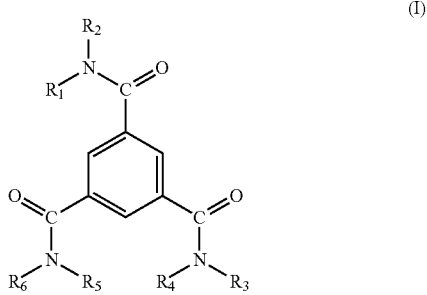

wherein
R$_1$, R$_2$, R$_3$, R$_4$, R$_5$ and R$_6$, independently of one another, are
hydrogen,
C$_1$-C$_{20}$alkyl,
C$_2$-C$_{20}$alkyl substituted by C$_1$-C$_{10}$alkylamino, di(C$_1$-C$_{10}$alkyl)amino, C$_1$-C$_{10}$alkyloxy or hydroxy;
C$_3$-C$_{20}$alkenyl,
C$_5$-C$_{12}$cycloalkyl,
C$_5$-C$_{12}$cycloalkyl substituted by 1, 2 or 3 C$_1$-C$_{10}$alkyl;
cyclohexylmethyl;
cyclohexylmethyl substituted by 1, 2 or 3 C$_1$-C$_{10}$alkyl;
C$_5$-C$_9$cycloalkenyl,
C$_5$-C$_9$cycloalkenyl substituted by 1, 2 or 3 C$_1$-C$_{10}$alkyl;
phenyl substituted by 1, 2 or 3 radicals selected from the group consisting of C$_1$-C$_{10}$alkyl, C$_1$-C$_{10}$alkyloxy, hydroxy, halogen, trihalogenmethyl, trihalogenmethoxy, benzoyl, phenylamino, acylamino and phenylazo;
C$_7$-C$_9$-phenylalkyl,
C$_7$-C$_9$-phenylalkyl which is substituted on the phenyl by 1, 2 or 3 radicals selected from the group consisting of C$_1$-C$_{10}$alkyl, C$_1$-C$_{10}$alkoxy and hydroxy;
naphthyl,
naphthyl substituted by C$_1$-C$_{10}$alkyl;
adamantyl, or
a 5 to 6 membered heterocyclic group.

Examples of C$_1$-C$_{20}$alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methyl-hexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methyl-undecyl, dodecyl, 1,1,3,3,5,5-hexamethylhexyl, tridecyl, tetradecyl, pentadecyl, hexadecyl, heptadecyl, octadecyl and eicosyl. Preferred examples are butyl, octyl and octadecyl.

Examples of C$_2$-C$_{20}$alkyl substituted by C$_1$-C$_{10}$alkylamino, di(C$_1$-C$_{10}$alkyl)amino, C$_1$-C$_{10}$alkyloxy or hydroxy are 3-methylaminopropyl, 2-dimethylaminoethyl, 2-diethylaminoethyl, 3-dimethylaminopropyl, 3-diethylaminopropyl, 2-methoxyethyl, 2-ethoxyethyl, 2-methoxypropyl, 3-methoxypropyl, 2-ethoxypropyl, 3-isopropoxypropyl and hydroxyethyl. Preferred examples are 3-dimethylaminopropyl, 3-methoxypropyl and 2-methoxyethyl.

Examples of C$_3$-C$_{20}$alkenyl are allyl, 2-methallyl, butenyl, pentenyl, hexenyl and oleyl. The carbon atom in position 1 is preferably saturated. Preferred examples are allyl and oleyl.

Examples of C$_5$-C$_{12}$cycloalkyl are cyclopentyl, cyclohexyl, cycloheptyl, cyclooctyl and cyclododecyl. Preferred examples are cyclohexyl, cycloheptyl, cyclooctyl and cyclododecyl.

Preferred examples of C$_5$-C$_{12}$cycloalkyl substituted by 1, 2 or 3 C$_1$-C$_{10}$alkyl are 3-methylcyclohexyl and 2,3-dimethylcyclohexyl.

An example of cyclohexylmethyl substituted by 1, 2 or 3 C$_1$-C$_{10}$alkyl is 1-cyclohexylethyl.

An example of C$_5$-C$_9$cycloalkenyl is cyclohexenyl.

An example of C$_5$-C$_9$cycloalkenyl substituted by 1, 2 or 3 C$_1$-C$_{10}$alkyl is methylcyclohexenyl.

Examples of phenyl substituted by 1, 2 or 3 radicals selected from the group consisting of C$_1$-C$_{10}$alkyl, C$_1$-C$_{10}$alkyloxy, hydroxy, halogen, trihalogenmethyl, trihalogenmethoxy, benzoyl, phenylamino, acylamino and phenylazo are 4-methylphenyl, 2-ethylphenyl, 4-ethylphenyl, 4-isopropylphenyl, 4-tert-butylphenyl, 4-sec-butylphenyl, 4-isobutylphenyl, 3,5-dimethylphenyl, 3,4-dimethylphenyl, 2,4-dimethylphenyl, 2,6-diethylphenyl, 2-ethyl-6-methylphenyl, 2,6-diisopropylphenyl, 4-methoxyphenyl, 4-ethoxyphenyl, 4-hydroxyphenyl, 4-fluorophenyl, 3,5-difluorophenyl, 2-chlorophenyl, 3-chlorophenyl, 3-chloro-6-methylphenyl, 3,5-di(trifluoromethyl)phenyl, 4-trifluoromethoxyphenyl, 2-benzoylphenyl, 4-phenylaminophenyl, 4-acetamidophenyl and 4-(phenylazo)phenyl. A preferred example is 3,4-dimethylphenyl.

Examples of C$_7$-C$_9$-phenylalkyl are benzyl and 2-phenylethyl. Benzyl is preferred.

Examples of C$_7$-C$_9$-phenylalkyl which is substituted on the phenyl by 1, 2 or 3 radicals selected from the group consisting of C$_1$-C$_{10}$alkyl, C$_1$-C$_{10}$alkoxy and hydroxy are methylbenzyl, dimethylbenzyl, trimethylbenzyl, tert-butylbenzyl, methoxybenzyl and 3,5-di-tert-butyl-4-hydroxybenzyl.

An example of naphthyl substituted by C$_1$-C$_{10}$alkyl is methylnaphthyl.

Examples of a 5 to 6 membered heterocyclic group are 2-picolyl, (2-furyl)methyl, (2-tetrahydrofuryl)methyl, 2-pyrimidyl, 6-methyl-2-pyridyl, 1,2,4-triazol-3-yl and 2-(1-piperazinyl)ethyl.

The aromatic trisamides are for example of formulae IIa, IIb or IIc

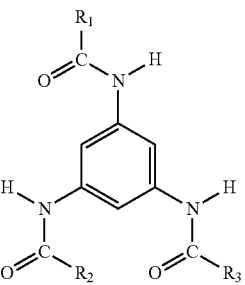

(IIa)

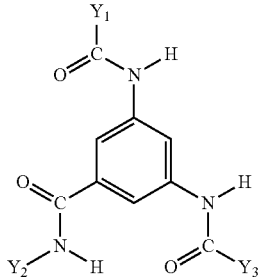

(IIb)

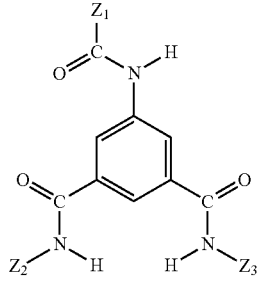

(IIc)

wherein
R$_1$, R$_2$ and R$_3$, or Y$_1$, Y$_2$ and Y$_3$, or Z$_1$, Z$_2$ and Z$_3$ independently of one another are C$_1$-C$_{20}$alkyl unsubstituted or substituted by one or more hydroxy;
C$_2$-C$_{20}$alkenyl unsubstituted or substituted by one or more hydroxy;
C$_2$-C$_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

bis[$C_3$-$C_{12}$cycloalkyl]-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

phenylethenyl unsubstituted or substituted by one or more $C_1$-$C_{20}$alkyl;

biphenyl-($C_1$-$C_{10}$alkyl) unsubstituted or substituted by one or more $C_1$-$C_{20}$alkyl;

naphthyl unsubstituted or substituted by one or more $C_1$-$C_{20}$alkyl;

naphthyl-$C_1$-$C_{20}$alkyl unsubstituted or substituted by one or more $C_1$-$C_{20}$alkyl;

naphthoxymethyl unsubstituted or substituted by one or more $C_1$-$C_{20}$alkyl;

biphenylenyl, flourenyl, anthryl;

a 5- to 6-membered heterocyclic radical unsubstituted or substituted by one or more $C_1$-$C_{20}$alkyl;

a $C_1$-$C_{20}$hydrocarbon radical containing one or more halogen; or tri($C_1$-$C_{10}$alkyl)silyl($C_1$-$C_{10}$alkyl);

with the proviso that at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl unsubstituted or substituted by one or more hydroxy;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

biphenyl-($C_1$-$C_{10}$alkyl) unsubstituted or substituted by one or more $C_1$-$C_{20}$alkyl;

naphthyl-$C_1$-$C_{20}$alkyl unsubstituted or substituted by one or more $C_1$-$C_{20}$alkyl; or tri($C_1$-$C_{10}$alkyl)silyl($C_1$-$C_{10}$alkyl).

According to a preferred embodiment, at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl, or $C_3$-$C_{12}$cycloalkyl unsubstituted or substituted by one or more $C_1$-$C_{20}$alkyl.

According to a particular preferred embodiment, at least one of the radicals $R_1$, $R_2$ and $R_3$, or $Y_1$, $Y_2$ and $Y_3$, or $Z_1$, $Z_2$ and $Z_3$ is branched $C_3$-$C_{10}$alkyl.

Examples of $C_1$-$C_{20}$alkyl, e.g. branched $C_3$-$C_{20}$alkyl, unsubstituted or substituted by one or more hydroxy, e.g. 1, 2 or 3 hydroxy, are ethyl, n-propyl, 1-methylethyl, n-butyl, 2-methylpropyl, 1-methylpropyl, tert-butyl, pentyl, 1-methylbutyl, 2-methylbutyl, 3-methylbutyl, 1,1-dimethylpropyl, 1-ethylpropyl, tert-butylmethyl, hexyl, 1-methylpentyl, heptyl, isoheptyl, 1-ethylhexyl, 2-ethylpentyl, 1-propylbutyl, octyl, nonyl, isononyl, neononyl, 2,4,4-trimethylpentyl, undecyl, tridecyl, pentadecyl, heptadecyl, hydroxymethyl and 1-hydroxyethyl. Branched $C_3$-$C_{10}$alkyl is particularly preferred. One of the preferred meanings of the radicals $R_1$, $R_2$ and $R_3$, or $Y_1$, $Y_2$ and $Y_3$, or $Z_1$, $Z_2$ and $Z_3$ is branched $C_3$-$C_{10}$alkyl with a quaternary C atom in position 1, in particular —C(CH$_3$)$_2$—H or —C(CH$_3$)$_2$—(C$_1$-C$_7$alkyl).

Examples of $C_2$-$C_{20}$alkenyl unsubstituted or substituted by one or more hydroxy, e.g. 1, 2 or 3 hydroxy, are 9-decenyl, 8-heptadecenyl and 11-hydroxy-8-heptadecenyl.

Examples of $C_2$-$C_{20}$alkyl interrupted by oxygen are t-butoxymethyl, t-butoxyethyl, t-butoxypropyl and t-butoxybutyl.

Examples of $C_2$-$C_{20}$alkyl interrupted by sulfur are (H$_3$C)$_3$C—S—CH$_2$—, (H$_3$C)$_3$C—S—C$_2$H$_4$—, (H$_3$C)$_3$C—S—C$_3$H$_6$— and (H$_3$C)$_3$C—S—C$_4$H$_8$—.

Examples of $C_3$-$C_{12}$cycloalkyl unsubstituted or substituted by one or more $C_1$-$C_{20}$alkyl, e.g. 1, 2, 3 or 4 $C_1$-$C_4$alkyl, are cyclopropyl, 3-methylcyclopropyl, 2,2,3,3-tetramethylcyclopropyl, cyclobutyl, cyclopentyl, cyclohexyl, 1-methylcyclohexyl, 2-methylcyclohexyl, 3-methylcyclohexyl, 4-methylcyclohexyl, 4-tert-butylcyclohexyl and cycloheptyl.

Examples of ($C_3$-$C_{12}$cycloalkyl)-$C_1$-$C_{10}$alkyl unsubstituted or substituted by one or more $C_1$-$C_{20}$alkyl, e.g. 1, 2 or 3 $C_1$-$C_4$alkyl, are cyclopentylmethyl, 2-cyclopentylethyl, cyclohexylmethyl, 2-cyclohexylethyl, 3-cyclohexylpropyl, 4-cyclohexylbutyl and (4-methylcyclohexyl)methyl.

An example of bis[$C_3$-$C_{12}$cycloalkyl]-$C_1$-$C_{10}$alkyl unsubstituted or substituted by one or more $C_1$-$C_{20}$alkyl, e.g. 1, 2 or 3 $C_1$-$C_4$alkyl, is dicyclohexylmethyl.

Examples of a bicyclic or tricyclic hydrocarbon radical with 5 to 20 carbon atoms unsubstituted or substituted by one or more $C_1$-$C_{20}$alkyl, e.g. 1, 2 or 3 $C_1$-$C_4$alkyl, are

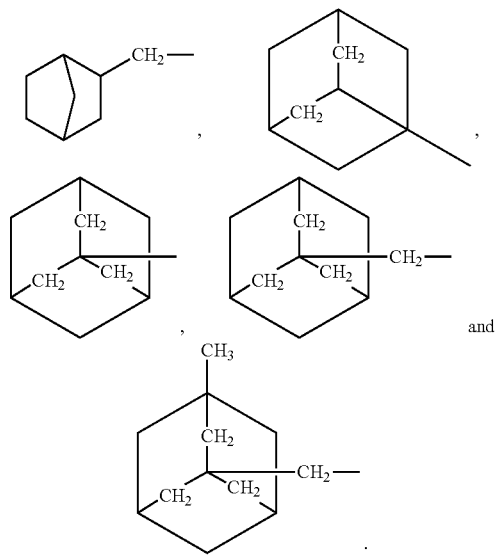

Examples of phenyl unsubstituted or substituted by one or more radicals, e.g. 1, 2 or 3 radicals, selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro, preferably $C_1$-$C_4$alkyl, $C_1$-$C_4$alkoxy, $C_1$-$C_4$alkylamino, di($C_1$-$C_4$alkyl)amino, hydroxy and nitro, are phenyl, 3-methylphenyl, 3-methoxyphenyl, 4-methylphenyl, 4-ethylphenyl, 4-propylphenyl, 4-isopropylphenyl, 4-tert-butylphenyl, 4-isopropoxyphenyl, 2,3-dimethoxyphenyl, 2-nitrophenyl, 3-methyl-6-nitrophenyl, 4-dimethylaminophenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-trimethylphenyl and 3,5-di-tert-butyl-4-hydroxyphenyl.

Examples of phenyl-$C_1$-$C_{20}$alkyl unsubstituted or substituted by one or more radicals, e.g. 1, 2 or 3 radicals, selected from $C_1$-$C_{20}$alkyl, $C_3$-$C_{12}$cycloalkyl, phenyl, $C_1$-$C_{20}$alkoxy and hydroxy, preferably $C_1$-$C_4$alkyl, $C_3$-$C_6$cycloalkyl, phenyl, $C_1$-$C_4$alkoxy and hydroxy, are benzyl, α-cyclohexylbenzyl, diphenylmethyl, 1-phenylethyl, α-hydroxybenzyl, 2-phenylethyl, 2-phenylpropyl, 3-phenylpropyl, 3-methylbenzyl, 3,4-dimethoxybenzyl and 2-(3,4-dimethoxyphenyl)ethyl.

An example of phenylethenyl unsubstituted or substituted by one or more $C_1$-$C_{20}$alkyl, e.g. 1, 2 or 3 $C_1$-$C_4$alkyl, is 2-(4-methylphenyl)ethenyl.

An example of biphenyl-($C_1$-$C_{10}$alkyl) unsubstituted or substituted by one or more $C_1$-$C_{20}$alkyl, e.g. 1, 2 or 3 $C_1$-$C_4$alkyl, is 4-biphenylmethyl.

Examples of naphthyl unsubstituted or substituted by one or more $C_1$-$C_{20}$alkyl, e.g. 1, 2 or 3 $C_1$-$C_4$alkyl, are 1-naphthyl and 2-naphthyl.

Examples of naphthyl-$C_1$-$C_{20}$alkyl unsubstituted or substituted by one or more $C_1$-$C_{20}$alkyl, e.g. 1, 2 or 3 $C_1$-$C_4$alkyl, are 1-naphthylmethyl and 2-naphthylmethyl.

An example of naphthoxymethyl unsubstituted or substituted by one or more $C_1$-$C_{20}$alkyl, e.g. 1, 2 or 3 $C_1$-$C_4$alkyl, is 1-naphthoxymethyl.

An examples of biphenylenyl, flourenyl or anthryl is 2-biphenylenyl, 9-flourenyl, 1-flourenyl or 9-anthryl, respectively.

Examples of a 5- to 6-membered heterocyclic radical unsubstituted or substituted by one or more $C_1$-$C_{20}$alkyl, e.g. 1, 2 or 3 $C_1$-$C_4$alkyl, are 3-pyridinyl, 4-pyridinyl, 2-hydroxypyridin-3-yl, 3-quinolinyl, 4-quinolinyl, 2-furyl, 3-furyl and 1-methyl-2-pyrryl.

Examples of a $C_1$-$C_{20}$hydrocarbon radical containing one or more halogen, e.g. 1, 2, 3, 4, 5, or 6-F, —Cl or -J, are 1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl and 2,4-bis[trifluoromethyl]phenyl.

Examples of compounds of formula (IIa) are:
1,3,5-tris[cyclohexylcarbonylamino]benzene,
1,3,5-tris[2,2-dimethylpropionylamino]benzene,
1,3,5-tris[4-methylbenzoylamino]benzene,
1,3,5-tris[3,4-dimethylbenzoylamino]benzene,
1,3,5-tris[3,5-dimethylbenzoylamino]benzene,
1,3,5-tris[cyclopentanecarbonylamino]benzene,
1,3,5-tris[1-adamantanecarbonylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1,3,5-tris[2-cyclohexyl-acetylamino]benzene,
1,3,5-tris[3-cyclohexyl-propionylamino]benzene,
1,3,5-tris[4-cyclohexyl-butyrylamino]benzene,
1,3,5-tris[5-cyclohexyl-valeroylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyryl)-aminobenzene,
1,3-bis[3,3-dimethylbutyrylamino]-5-pivaloylamino-benzene,
1,3-bis[3,3-dimethylbutyrylamino]-5-isobutyryl-aminobenzene,
1,3-bis[3,3-dimethylbutyrylamino]-5-(2,2-dimethyl-butyrylamino)aminobenzene, and
1,3,5-tris[3-(trimethylsilyl)propionylamino]benzene.

Further examples of compounds of formula (IIa) are:
1,3,5-tris[2,2-dimethylvaleroylamino]benzene,
1,3,5-tris[3,3-dimethylvaleroylamino]benzene,
1,3,5-tris[2,4-dimethylvaleroylamino]benzene,
1,3,5-tris[4,4-dimethylvaleroylamino]benzene,
1,3,5-tris[4-methylvaleroylamino]benzene,
1,3,5-tris[2-methylbutyrylamino]benzene,
1,3,5-tris[2-methylvaleroylamino]benzene,
1,3,5-tris[3-methylvaleroylamino]benzene,
1,3,5-tris[2,2,3,3-tetramethyl-cyclopropanecarbonylamino]benzene,
1,3,5-tris[cyclopentylacetylamino]benzene,
1,3,5-tris[3-cyclopentylpropionylamino]benzene,
1,3,5-tris[2-norbornyl-acetylamino]benzene,
1,3,5-tris[4-t-butylcyclohexane-1-carbonylamino]benzene,
1,3,5-tris[2-(t-butoxy)-acetylamino]benzene,
1,3,5-tris[3-(t-butoxy)-propionylamino]benzene,
1,3,5-tris[4-(t-butoxy)-butyrylamino]benzene,
1,3,5-tris[5-t-butoxy-valeroylamino]benzene,
1,3,5-tris[cyclopropanecarbonylamino]benzene,
1,3,5-tris[2-methylcyclopropane-1-carbonylamino]benzene,
1,3,5-tris[3-noradamantane-1-carbonylamino]benzene,
1,3,5-tris[biphenyl-4-acetylamino]benzene,
1,3,5-tris[2-naphthyl-acetylamino]benzene,
1,3,5-tris[3-methylphenyl-acetylamino]benzene,
1,3,5-tris[(3,4-dimethoxyphenyl)-acetylamino]benzene,
1,3,5-tris[(3-trimethylsilyl-propionylamino]benzene, and
1,3,5-tris[(4-trimethylsilyl-butyrylamino]benzene.

Examples of compounds of formula (IIb) are:
N-t-butyl-3,5-bis-(3-methylbutyrylamino)-benzamide,
N-t-butyl-3,5-bis-(pivaloylamino)-benzamide,
N-t-octyl-3,5-bis-(pivaloylamino)-benzamide,
N-(1,1-dimethyl-propyl)-3,5-bis-(pivaloylamino)-benzamide,
N-(t-octyl)-3,5-bis-(isobutyrylamino)-benzamide,
N-(t-butyl)-3,5-bis-(pivaloylamino)-benzamide,
N-(2,3-dimethyl-cyclohexyl)-3,5-bis-(pivaloylamino)-benzamide,
N-t-butyl-3,5-bis-(cyclopentanecarbonylamino)-benzamide,
N-(3-methylbutyl)-3,5-bis-(3-methylbutyrylamino)-benzamide,
N-(3-methylbutyl)-3,5-bis-(pivaloylamino)-benzamide,
N-(3-methylbutyl)-3,5-bis-(4-methylpentanoylamino)-benzamide,
N-(3-methylbutyl)-3,5-bis-(cyclopentanecarbonylamino)-benzamide,
N-(3-methylbutyl)-3,5-bis-(cyclohexanecarbonylamino)-benzamide,
N-cyclopentyl-3,5-bis-(3-methylbutyrylamino)-benzamide,
N-cyclopentyl-3,5-bis-(pivaloylamino)-benzamide, N-cyclopentyl-3,5-bis-(4-methylpentanoylamino)-benzamide,
N-cyclopentyl-3,5-bis-(cyclopentanecarbonylamino)-benzamide,
N-cyclopentyl-3,5-bis-(cyclohexanecarbonylamino)-benzamide,
N-cyclohexyl-3,5-bis-(3-methylbutyrylamino)-benzamide,
N-cyclohexyl-3,5-bis-(pivaloylamino)-benzamide,
N-cyclohexyl-3,5-bis-(4-methylpentanoylamino)-benzamide,
N-cyclohexyl-3,5-bis-(cyclopentanecarbonylamino)-benzamide,
N-cyclohexyl-3,5-bis-(cyclohexanecarbonylamino)-benzamide,
N-isopropyl-3,5-bis-(pivaloylamino)-benzamide,
N-isopropyl-3,5-bis-(isobutyrylamino)-benzamide,
N-t-butyl-3,5-bis-(2,2-dimethylbutyrylamino)-benzamide, and
N-t-octyl-3,5-bis-(2,2-dimethylbutyrylamino)-benzamide.
Examples of compounds of formula (IIc) are:
5-pivaloylamino-isophthalic acid N,N'-di-t-butyldiamide,
5-pivaloylamino-isophthalic acid N,N'-di-t-octyldiamide,
5-(2,2-dimethylbutyrylamino)-isophthalic acid N,N'-di-t-butyldiamide,
5-(2,2-dimethylbutyrylamino)-isophthalic acid N,N'-di-t-octyldiamide,
5-(3-methylbutyrylamino)-isophthalic acid N,N'-di-cyclohexyldiamide,
5-(pivaloylamino)-isophthalic acid N,N'-di-cyclohexyldiamide,
5-(cyclopentanecarbonylamino)-isophthalic acid N,N'-di-cyclohexyldiamide,
5-(cyclohexylcarbonylamino)-isophthalic acid N,N'-di-cyclohexyldiamide,
5-(cyclopentanecarbonylamino)-isophthalic acid N,N'-bis-(2-methylcyclohexyl)diamide,
5-(cyclohexanecarbonylamino)-isophthalic acid N,N'-bis-(2-methylcyclohexyl)diamide,
5-((1-methylcyclohexanecarbonyl)amino)-isophthalic acid N,N'-bis-(2-methylcyclohexyl)diamide, and
5-((2-methylcyclohexanecarbonyl)amino)-isophthalic acid N,N'-bis-(2-methylcyclohexyl)diamide.

The addition of the aromatic trisamides to the thermoplastic polymer can be carried out in all customary mixing machines in which the polymer is melted and mixed with the additives.

Suitable machines are known to those skilled in the art. They are predominantly mixers, kneaders and extruders.

The process is preferably carried out in an extruder by introducing the additives during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7). For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The polymers need to be subjected to an elevated temperature for a sufficient period of time during incorporation of additives. The temperature is generally above the softening point of the polymers.

In a preferred embodiment of the processes of the present invention, a temperature range lower than 280° C., particularly from about 160° C. to 280° C. is employed. In a particularly preferred process variant, the temperature range from about 200° C. to 270° C. is employed.

In the processes and compositions of the present invention the above-described aromatic trisamide compounds are present in concentrations, based on the amount of the polymer, of from about 0.001 to about 1.0% by weight. For instance, the trisamides are present from about 0.005 to 0.5% by weight, from about 0.01 to about 0.1% by weight, from about 0.01 to about 0.09% by weight, based on the weight of the polymer. The aromatic trisamides can be added as individual compounds or as mixtures to the polymer.

Incorporation of additives into the polymers can be carried out, for example, by mixing the above-described aromatic trisamides or mixtures thereof and, if desired, further additives into the polymers using the methods customary in process technology.

The aromatic trisamides can also be added to the polymers in the form of a masterbatch in which these compounds are present, for example, in a concentration of from about 1 to 25% by weight. The present invention therefore further provides a concentrate in which the compounds of the invention are present in a concentration of 1-25% by weight and which can be added to the thermoplastic polymer.

Another aspect of this invention is that instead of melt blending, the present trisamides may be topically applied to the electret material.

For example in the case where the electret material is cotton the present trisamides may be topically applied.

Another aspect of this invention is the co-use of certain other additives along with the present aromatic trisamides. These certain other additives are incorporated in the same manner as the trisamides.

When employed without certain co-additives, the trisamides

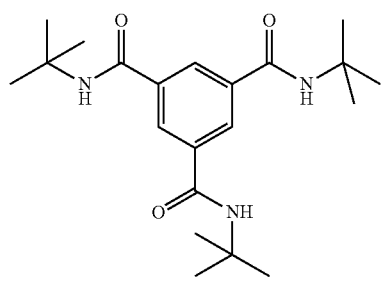

and

-continued

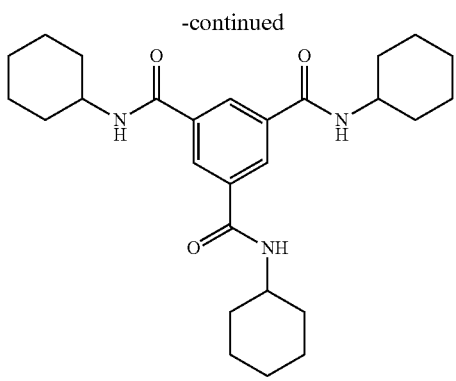

are excluded from the present invention.

For instance, the class of stabilizers of the hindered amine light stabilizers (HALS) are advantageously also employed in the present compositions and processes.

The present sterically hindered amine stabilizers contain at least one moiety of formula

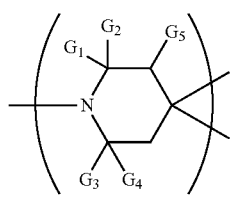

where $G_1$, $G_2$, $G_3$ and $G_4$ are independently alkyl of 1 to 8 carbon atoms or $G_1$ and $G_2$ or $G_3$ and $G_4$ together are pentamethylene and $G_5$ is hydrogen or alkyl of 1 to 8 carbon atoms.

The hindered amines are disclosed for example in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584, 6,472,456, and 7,030,196. The relevant disclosures of these patents are hereby incorporated by reference.

U.S. Pat. Nos. 6,271,377, 6,392,041 and 6,376,584, cited above disclose hindered hydroxyalkoxyamine stabilizers.

Suitable hindered amines include for example:
1) 1-cyclohexyloxy-2,2,6,6-tetramethyl-4-octadecylaminopiperidine,
2) bis(2,2,6,6-tetramethylpiperidin-4-yl)sebacate,
3) bis(1-acetoxy-2,2,6,6-tetramethylpiperidin-4-yl)sebacate,
4) bis(1,2,2,6,6-pentamethyl-4-yl)sebacate,
5) bis(1-cyclohexyloxy-2,2,6,6-tetramethylpiperidin-4-yl)sebacate,
6) bis(1-octyloxy-2,2,6,6-tetramethylpiperidin-4-yl)sebacate;
7) bis(1-acyl-2,2,6,6-tetramethylpiperidin-4-yl)sebacate,
8) bis(1,2,2,6,6-pentamethyl-4-piperidyl)n-butyl-3,5-di-tert-butyl-4-hydroxybenzylmalonate
9) 2,4-bis[(1-cyclohexyloxy-2,2,6,6-tetramethylpiperidin-4-yl)butylamino]-6-(2-hydroxy-ethylamino-s-triazine,
10) bis(1-cyclohexyloxy-2,2,6,6-tetramethylpiperidin-4-yl) adipate,
11) 2,4-bis[(1-cyclohexyloxy-2,2,6,6-piperidin-4-yl)butylamino]-6-chloro-s-triazine,
12) 1-(2-hydroxy-2-methylpropoxy)-4-hydroxy-2,2,6,6-tetramethylpiperidine,
13) 1-(2-hydroxy-2-methylpropoxy)-4-oxo-2,2,6,6-tetramethylpiperidine,
14) 1-(2-hydroxy-2-methylpropoxy)-4-octadecanoyloxy-2,2,6,6-tetramethylpiperidine,
15) bis(1-(2-hydroxy-2-methylpropoxy)-2,2,6,6-tetramethylpiperidin-4-yl)sebacate,
16) bis(1-(2-hydroxy-2-methylpropoxy)-2,2,6,6-tetramethylpiperidin-4-yl)adipate,
17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
18) 4-benzoyl-2,2,6,6-tetramethylpiperidine,
19) di-(1,2,2,6,6-pentamethylpiperidin-4-yl)p-methoxybenzylidenemalonate,
20) 4-stearyloxy-2,2,6,6-tetramethylpiperidine,
21) bis(1-octyloxy-2,2,6,6-tetramethylpiperidyl)succinate,
22) 1,2,2,6,6-pentamethyl-4-aminopiperidine,
23) 2-undecyl-7,7,9,9-tetramethyl-1-oxa-3,8-diaza-4-oxo-spiro[4,5]decane,
24) tris(2,2,6,6-tetramethyl-4-piperidyl)nitrilotriacetate,
25) tris(2-hydroxy-3-(amino-(2,2,6,6-tetramethylpiperidin-4-yl)propyl)nitrilotriacetate,
26) tetrakis(2,2,6,6-tetramethyl-4-piperidyl)-1,2,3,4-butane-tetracarboxylate,
27) tetrakis(1,2,2,6,6-pentamethyl-4-piperidyl)-1,2,3,4-butane-tetracarboxylate,
28) 1,1'-(1,2-ethanediyl)-bis(3,3,5,5-tetramethylpiperazinone),
29) 3-n-octyl-7,7,9,9-tetramethyl-1,3,8-triazaspiro[4.5]decan-2,4-dione,
30) 8-acetyl-3-dodecyl-7,7,9,9-tetramethyl-1,3,8-triazaspiro [4.5]decane-2,4-dione,
31) 3-dodecyl-1-(2,2,6,6-tetramethyl-4-piperidyl)pyrrolidin-2,5-dione,
32) 3-dodecyl-1-(1,2,2,6,6-pentamethyl-4-piperidyl)pyrrolidine-2,5-dione,
33) N,N'-bis-formyl-N,N'-bis(2,2,6,6-tetramethyl-4-piperidyl)hexamethylenediamine,
34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
35) the condensate of 1-(2-hydroxyethyl)-2,2,6,6-tetramethyl-4-hydroxypiperidine and succinic acid,
36) linear or cyclic condensates of N,N'-bis(2,2,6,6-tetramethyl-4-piperidyl)-hexamethylenediamine and 4-tert-octylamino-2,6-dichloro-1,3,5-triazine,
37) linear or cyclic condensates of N,N'-bis(2,2,6,6-tetramethyl-4-piperidyl)-hexamethylenediamine and 4-cyclohexylamino-2,6-dichloro-1,3,5-triazine,
38) linear or cyclic condensates of N,N'-bis-(2,2,6,6-tetramethyl-4-piperidyl)-hexamethylenediamine and 4-morpholino-2,6-dichloro-1,3,5-triazine,
39) linear or cyclic condensates of N,N'-bis-(1,2,2,6,6-pentamethyl-4-piperidyl)-hexamethylenediamine and 4-morpholino-2,6-dichloro-1,3,5-triazine,
40) the condensate of 2-chloro-4,6-bis(4-n-butylamino-2,2,6,6-tetramethylpiperidyl)-1,3,5-triazine and 1,2-bis(3-aminopropylamino)ethane,
41) the condensate of 2-chloro-4,6-di-(4-n-butylamino-1,2,2,6,6-pentamethylpiperidyl)-1,3,5-triazine and 1,2-bis-(3-aminopropylamino)ethane,
42) a reaction product of 7,7,9,9-tetramethyl-2-cycloundecyl-1-oxa-3,8-diaza-4-oxospiro[4,5]decane and epichlorohydrin,
43) poly[methyl,(3-oxy-(2,2,6,6-tetramethylpiperidin-4-yl) propyl)]siloxane, CAS #182635-99-0,
44) reaction product of maleic acid anhydride-$C_{18}$-$C_{22}$-α-olefin-copolymer with 2,2,6,6-tetramethyl-4-aminopiperidine, 45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, 46) the oligomeric compound which is the condensation product of 4,4'-hexamethylene-bis(amino-1,2,2,6,6-pentaamethylpiperidine) and 2,4-dichloro-6-[(1,2,2,6,6-pentaamethyl-piperidin-4-yl)butylamino]-s-triazine end-capped with 2-chloro-4,6-bis(dibutylamino)-s-triazine, 47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetra-methylpiperidin-4-yl)butylamino]-s-triazine end-capped with 2-chloro-4,6-bis(dibutylamino)-s-triazine, 48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetra-methylpiperidin-4-yl)butylamino]-s-triazine end-capped with 2-chloro-4,6-bis(dibutylamino)-s-triazine and 49) product obtained by reacting a product, obtained by reacting 1,2-bis(3-amino-propylamino)ethane with cyanuric chloride, with (2,2,6,6-tetramethylpiperidin-4-yl)butylamine.

Also included are the sterically hindered N—H, N-methyl, N-methoxy, N-propoxy, N-octyloxy, N-cyclohexyloxy, N-(2-hydroxy-2-methylpropoxy) and N-acyl analogues of any of the above mentioned compounds. For example, replacing an N—H hindered amine with an N-methyl hindered amine would be employing the N-methyl analogue in place of the N—H.

The class of additives known as the hydroxyphenylalkylphosphonic esters or monoesters are also advantageously employed in the processes and compositions of this invention. The hydroxyphenylalkylphosphonic esters or monoesters are disclosed for example in U.S. published app. No. 2004/0106767, the disclosure of which is hereby incorporated by reference. The hydroxyphenylalkylphosphonic esters or monoesters are of the formula

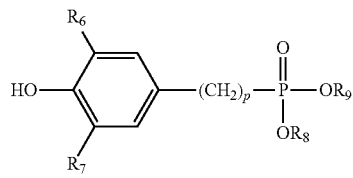

wherein
$R_6$ is isopropyl, tert-butyl, cyclohexyl or cyclohexyl which is substituted by 1-3 $C_1$-$C_4$alkyl groups,
$R_7$ is hydrogen, $C_1$-$C_4$alkyl, cyclohexyl or cyclohexyl which is substituted by 1-3 $C_1$-$C_4$alkyl groups,
$R_8$ is $C_1$-$C_{20}$alkyl, unsubstituted or $C_1$-$C_4$alkyl-substituted phenyl or naphthyl,
$R_9$ is hydrogen, $C_1$-$C_{20}$alkyl, unsubstituted or $C_1$-$C_4$alkyl-substituted phenyl or naphthyl; or is $$\frac{M^{r+}}{r};$$

$M^{r+}$ is an r-valent metal cation,
p is 1, 2, 3, 4, 5 or 6, and
r is 1, 2 or 3.

For example, the present hydroxyphenylalkylphosphonic ester or monoester is a compound of the formula P1 or P2

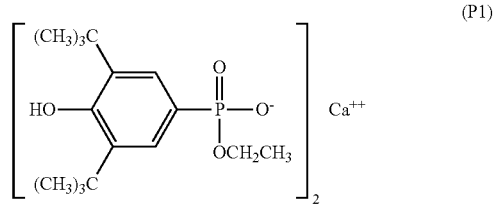

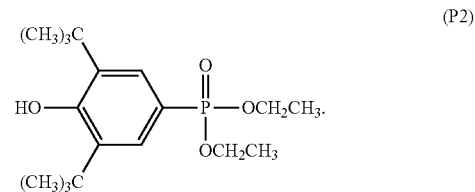

The further additives of the hindered amine light stabilizers and the hydroxyphenylalkylphosphonic esters or monoesters are employed at levels, based on the weight of the polymer, of from about 0.001 to 5.0% by weight, in particular from 0.01 to 2.0% by weight and particularly preferably from 0.02 to 1.0% by weight.

The following Examples further illustrate the invention. All percentages are in weight percent unless otherwise indicated.

Example 1

Polypropylene with MFI index of 1,100 is tumble mixed to contain 5.0% total weight of a sterically hindered amine (HALS), 2.0% total weight of a sterically hindered hydroxyphenylalkylphosphonic monoester (HPPME), 0.25% total weight aromatic trisamide (TA1)-(TA14).

These mixes are individually compounded using a Leistritz 27 mm twin screw extruder. The melt is cooled in a water trough and the strand is converted into pellets via a Conair-Jetro Model 304 pelletizer. The pellets collected are considered the masterbatches.

The same polypropylene is tumble mixed with the appropriate amounts of masterbatch for each of the evaluations. The tumble mixing is via a Marion Mixer SPS 1224 which is a paddle type slow RPM mixer. These are considered the final mixes.

Final mixes at 45 Kg each are converted into melt blown non woven textiles using a 500 mm Reifenhäuser Meltblowing Pilot Line. Also a 1,500 g portion of each final mix is processed on a 6-inch Meltblowing Pilot Line.

The polypropylene webs are then treated by corona discharge. The samples are tested using TSI Filter Tester (Model 8130) which employs challenges of sodium chloride aerosol at 32 liters per minute using a test area of 100 $cm^2$.

Results are in the tables below.

TABLE 1

6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 30.6 | 23.2 | 88.0 | 72.4 | 17.7 |
| 0.5% HALS | 30.5 | 16.8 | 91.5 | 82.1 | 10.2 |
| 0.5% HPPME | 30.6 | 18.7 | 93.3 | 90.6 | 2.9 |
| 0.05% TA1 | 30.4 | 18.0 | 93.4 | 93.3 | 0.1 |
| 0.02% TA2 | 30.5 | 18.3 | 92.2 | 91.3 | 0.9 |

TABLE 2

6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 58.3 | 34.6 | 96.9 | 90.6 | 6.4 |
| 0.5% HALS | 60.4 | 32.8 | 99.0 | 97.0 | 2.0 |
| 0.5% HPPME | 59.2 | 31.4 | 98.9 | 97.7 | 1.2 |
| 0.05% TA1 | 58.0 | 31.9 | 99.0 | 98.5 | 0.5 |
| 0.02% TA2 | 60.9 | 44.5 | 98.4 | 97.4 | 1.0 |

TABLE 3

500 mm Reifenhäuser Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 30.6 | 17.0 | 81.4 | 65.6 | 19.4 |
| 0.5% HALS | 30.5 | 15.8 | 90.0 | 85.4 | 5.1 |
| 0.5% HPPME | 30.6 | 16.8 | 90.4 | 86.8 | 4.0 |
| 0.05% TA1 | 30.4 | 16.2 | 92.1 | 90.8 | 1.4 |
| 0.02% TA2 | 30.5 | 13.8 | 90.4 | 88.0 | 2.8 |

TABLE 4

500 mm Reifenhäuser Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 58.3 | 28.0 | 94.7 | 78.4 | 17.2 |
| 0.5% HALS | 60.4 | 29.4 | 96.6 | 90.2 | 6.6 |
| 0.5% HPPME | 59.2 | 27.4 | 94.8 | 92.6 | 2.2 |
| 0.05% TA1 | 58.0 | 28.4 | 95.8 | 94.8 | 1.0 |
| 0.02% TA2 | 60.9 | 26.6 | 93.4 | 91.8 | 1.7 |

TABLE 5

PP 6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 30.9 | 22.2 | 85.6 | 67.7 | 20.9 |
| 0.5% HALS | 30.5 | 24.4 | 91.2 | 78.9 | 13.5 |
| 0.025% TA3 | 29.4 | 32.7 | 92.8 | 80.7 | 13.1 |
| 0.025% TA4 | 27.8 | 22.8 | 92.7 | 86.0 | 7.2 |
| 0.025% TA5 | 27.5 | 24.0 | 90.5 | 79.5 | 12.2 |
| 0.025% TA6 | 29.3 | 31.2 | 93.3 | 81.4 | 12.7 |

TABLE 6

PP 6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 30.1 | 17.0 | 86.7 | 60.9 | 29.8 |
| 0.5% HALS | 29.1 | 15.2 | 88.7 | 68.3 | 23.0 |
| 0.0125% TA7 | 29.5 | 11.6 | 80.5 | 63.4 | 21.3 |
| 0.0125% TA4 | 29.0 | 11.7 | 81.2 | 68.0 | 16.3 |

TABLE 7

6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 29.6 | 20.5 | 76.1 | 54.9 | 27.9 |
| 0.5% HALS | 29.2 | 17.9 | 84.0 | 66.6 | 20.7 |
| 0.02% TA8 | 27.2 | 21.6 | 90.9 | 84.7 | 6.9 |
| 0.02% TA9 | 28.6 | 22.8 | 91.2 | 83.0 | 9.0 |
| 0.02% TA10 | 28.2 | 23.1 | 88.4 | 70.6 | 20.1 |
| 0.02% TA11 | 29.3 | 20.7 | 88.9 | 74.5 | 16.2 |
| 0.02% TA12 | 29.1 | 21.5 | 89.8 | 78.7 | 12.4 |
| 0.02% TA13 | 27.7 | 21.9 | 89.9 | 77.0 | 14.4 |

TABLE 8

6-inch Meltblowing Pilot Line

| Formulation | Basis Weight (g/m²) | Filtration Efficiency (%) Before charging | Filtration Efficiency (%) After charging | Filtration Efficiency (%) Charged & aged (70° C./24 hrs) | Filtration Efficiency Loss (%) |
|---|---|---|---|---|---|
| Polypropylene (control) | 29.6 | 20.5 | 76.1 | 54.9 | 27.9 |
| 0.5% HALS | 29.2 | 17.9 | 84.0 | 66.6 | 20.7 |
| 0.5% HPPME | 30.6 | 21.4 | 88.7 | 74.6 | 15.9 |
| 0.02% TA8 | 27.2 | 19.9 | 87.2 | 83.4 | 4.4 |
| 0.02% TA10 | 27.5 | 16.1 | 82.4 | 77.3 | 6.2 |

It can be seen that the present aromatic trisamides provide polypropylene with excellent thermal and charge stability. The trisamides are present at very low levels.

sterically hindered hydroxyphenylalkylphosphonic monoester (HPPME)

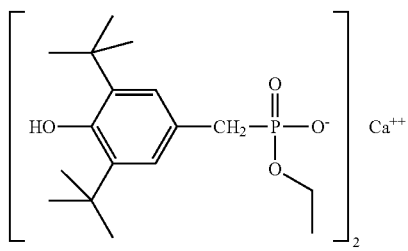

sterically hindered amine (HALS)

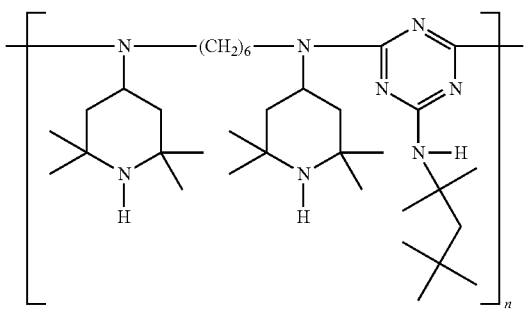

aromatic trisamide (TA1)

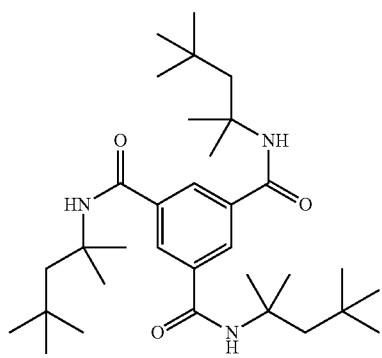 [SMILES: CC(C)(C)CC(C)(C)NC(=O)c1cc(C(=O)NC(C)(C)CC(C)(C)C)cc(C(=O)NC(C)(C)CC(C)(C)C)c1]

aromatic trisamide (TA2)

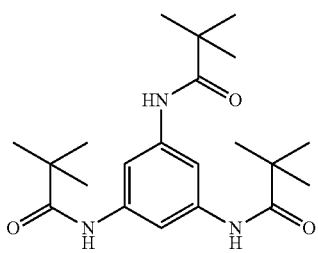 [SMILES: CC(C)(C)C(=O)Nc1cc(NC(=O)C(C)(C)C)cc(NC(=O)C(C)(C)C)c1]

aromatic trisamide (TA3)

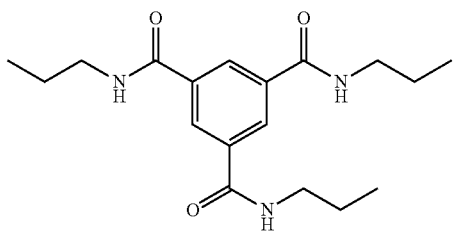 [SMILES: CCCNC(=O)c1cc(C(=O)NCCC)cc(C(=O)NCCC)c1]

aromatic trisamide (TA4)

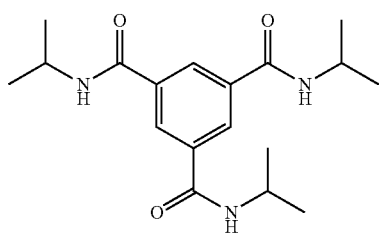 [SMILES: CC(C)NC(=O)c1cc(C(=O)NC(C)C)cc(C(=O)NC(C)C)c1]

aromatic trisamide (TA5)

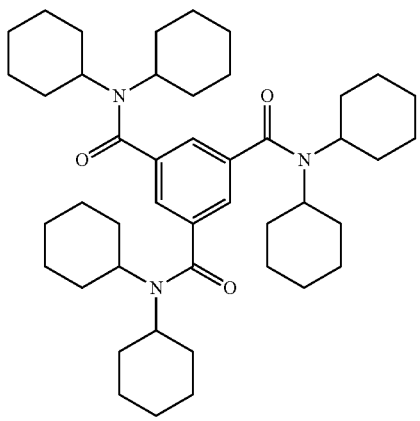 [SMILES: O=C(c1cc(C(=O)N(C2CCCCC2)C2CCCCC2)cc(C(=O)N(C2CCCCC2)C2CCCCC2)c1)N(C1CCCCC1)C1CCCCC1]

aromatic trisamide (TA6)

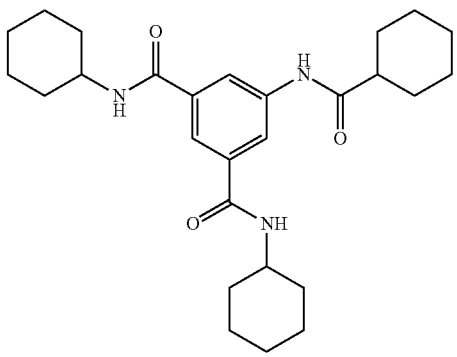 [SMILES: O=C(NC1CCCCC1)c1cc(NC(=O)C2CCCCC2)cc(C(=O)NC2CCCCC2)c1]

aromatic trisamide (TA7)
aromatic trisamide (TA10)
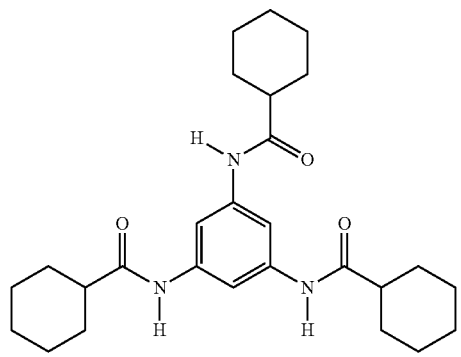 [SMILES: O=C(Nc1cc(NC(=O)C2CCCCC2)cc(NC(=O)C2CCCCC2)c1)C1CCCCC1]
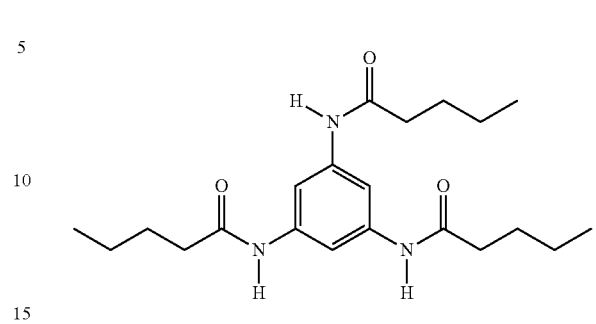
aromatic trisamide (TA8)
aromatic trisamide (TA11)
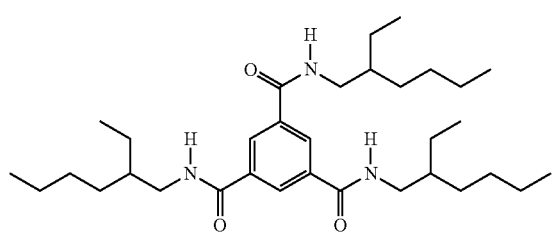 [SMILES: CCCCC(CC)CNC(=O)c1cc(C(=O)NCC(CC)CCCC)cc(C(=O)NCC(CC)CCCC)c1]
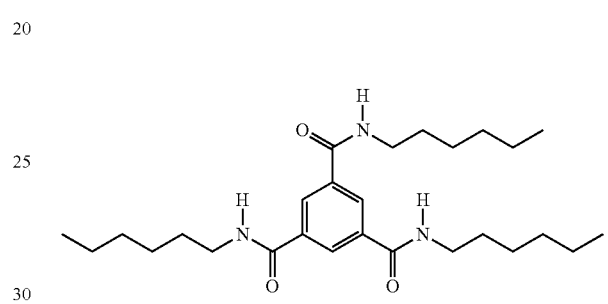
aromatic trisamide (TA9)
aromatic trisamide (TA12)
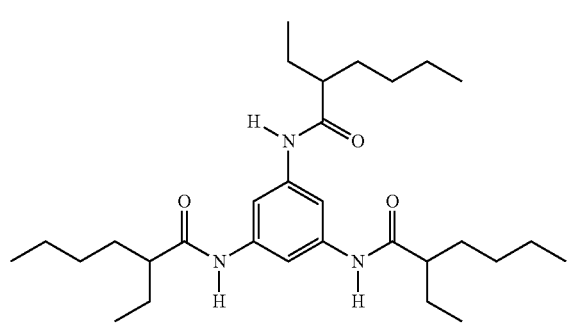 [SMILES: CCCCC(CC)C(=O)Nc1cc(NC(=O)C(CC)CCCC)cc(NC(=O)C(CC)CCCC)c1]
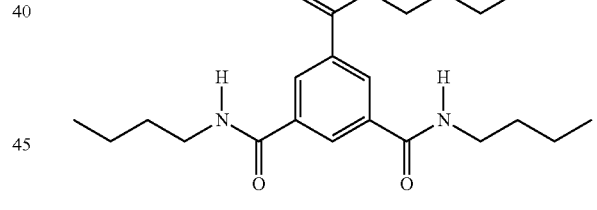
aromatic trisamide (TA13)
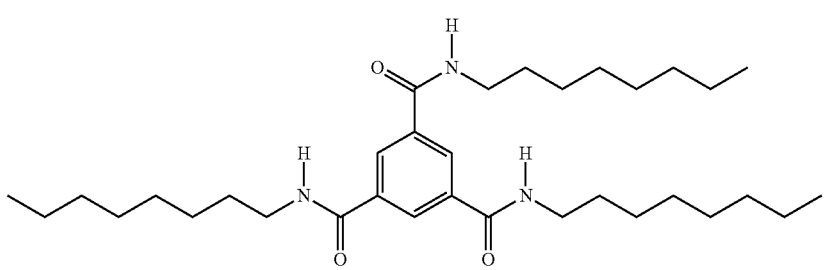 [SMILES: CCCCCCCCNC(=O)c1cc(C(=O)NCCCCCCCC)cc(C(=O)NCCCCCCCC)c1]

aromatic trisamide (TA14)

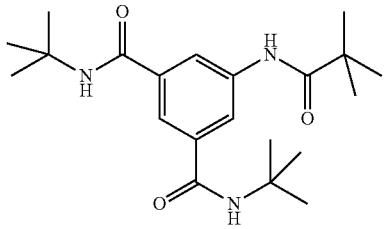 [SMILES: CC(C)(C)NC(=O)c1cc(NC(=O)C(C)(C)C)cc(C(=O)NC(C)(C)C)c1]

What is claimed is:
1. An electret material with enhanced thermal and charge stability, which material has been subjected to an electret treatment, comprising
a thermoplastic polymer and
incorporated therein,
one or more aromatic trisamide compounds of formula I

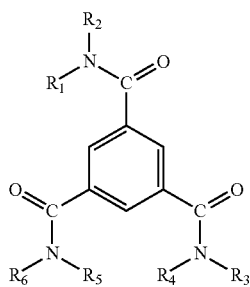
(I)

wherein
$R_1$, $R_2$, $R_3$, $R_4$, $R_5$ and $R_6$, independently of one another, are
hydrogen,
$C_1$-$C_{20}$alkyl,
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;
cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo;
$C_7$-$C_9$-phenylalkyl,
$C_7$-$C_9$-phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl;
adamantyl, or
a 5 to 6 membered heterocyclic group;
or one or more aromatic trisamide compounds of the formula IIa, IIb or IIc

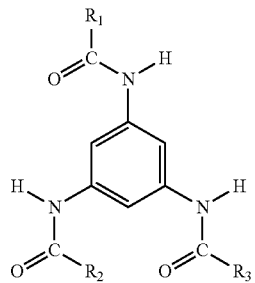
(IIa)

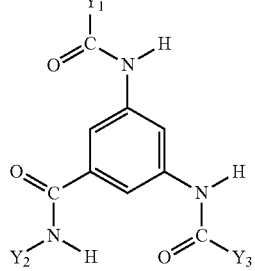
(IIb)

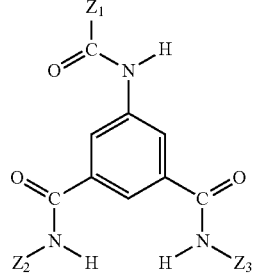
(IIc)

wherein
$R_1$, $R_2$ and $R_3$, or $Y_1$, $Y_2$ and $Y_3$, or $Z_1$, $Z_2$ and $Z_3$ independently of one another are $C_1$-$C_{20}$alkyl unsubstituted or substituted by one or more hydroxy;
$C_2$-$C_{20}$alkenyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
($C_3$-$C_{12}$cycloalkyl)-$C_1$-$C_{10}$alkyl unsubstituted or substituted by one or more $C_1$-$C_{20}$alkyl;
bis[$C_3$-$C_{12}$cycloalkyl]-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;

naphthyl-$C_1$-$C_{20}$alkyl unsubstituted or substituted by one or more $C_1$-$C_{20}$alkyl;

naphthoxymethyl unsubstituted or substituted by one or more $C_1$-$C_{20}$alkyl;

biphenylenyl, flourenyl, anthryl;

a 5- to 6-membered heterocyclic radical unsubstituted or substituted by one or more $C_1$-$C_{20}$alkyl;

a $C_1$-$C_{20}$hydrocarbon radical containing one or more halogen; or tri($C_1$-$C_{10}$alkyl)silyl($C_1$-$C_{10}$alkyl);

with the proviso that at least one of the radicals selected from $R_1$, $R_2$ and $R_3$, or $Y_1$, $Y_2$ and $Y_3$, or $Z_1$, $Z_2$ and $Z_3$ is branched $C_3$-$C_{20}$alkyl unsubstituted or substituted by one or more hydroxy;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

biphenyl-($C_1$-$C_{10}$alkyl) unsubstituted or substituted by one or more $C_1$-$C_{20}$alkyl;

naphthyl-$C_1$-$C_{20}$alkyl unsubstituted or substituted by one or more $C_1$-$C_{20}$alkyl; or tri($C_1$-$C_{10}$alkyl)silyl($C_1$-$C_{10}$alkyl), where the aromatic trisamide compounds are present from about 0.005 to 0.5% by weight, based on the weight of the thermoplastic polymer and where the thermoplastic polymer further has incorporated therein an additive selected from the group consisting of hydroxyphenylalkylphosphonic esters or monoesters and hindered amine light stabilizers.

2. An electret material according to claim 1 comprising one or more trisamide compounds of formula I.

3. An electret material according to claim 1 comprising one or more trisamide compounds of formula IIa, IIb or IIc.

4. An electret material according to claim 1 in which the thermoplastic polymer is polypropylene.

5. An electret material according to claim 1 in which the thermoplastic polymer is a nonwoven polypropylene web.

6. An electret material according to claim 1 where in the compounds of formula IIa, IIb and IIc, that
at least one of the radicals selected from $R_1$, $R_2$ and $R_3$, or $Y_1$, $Y_2$ and $Y_3$, or $Z_1$, $Z_2$ and $Z_3$ is
branched $C_3$-$C_{20}$alkyl, or is $C_3$-$C_{12}$cycloalkyl unsubstituted or substituted by one or more $C_1$-$C_{20}$alkyl.

7. An electret material according to claim 1 where the electret treatment is a corona treatment.

8. An electret material according to claim 1 wherein the thermoplastic polymer further has incorporated therein an additive selected from the group consisting of the hindered amine light stabilizers.

9. An electret material according to claim 1 wherein the thermoplastic polymer further has incorporated therein an additive selected from the group consisting of the hydroxyphenylalkylphosphonic esters or monoesters.

10. An electret material according to claim 1 wherein the aromatic trisamide compounds are present from about 0.01 to about 0.09% by weight, based on the weight of the thermoplastic polymer.

11. A method for preparing an electret material with enhanced thermal and charge stability, which method comprises
melt blending a thermoplastic polymer with one or more aromatic trisamide compounds of formula I

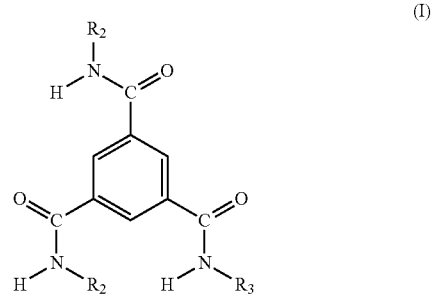

(I)

wherein
$R_1$, $R_2$ and $R_3$, independently of one another, are
$C_1$-$C_{20}$alkyl,
$C_2$-$C_{20}$alkyl substituted by $C_1$-$C_{10}$alkylamino, di($C_1$-$C_{10}$alkyl)amino, $C_1$-$C_{10}$alkyloxy or hydroxy;
$C_3$-$C_{20}$alkenyl,
$C_5$-$C_{12}$cycloalkyl,
$C_5$-$C_{12}$cycloalkyl substituted by 1, 2 or 3 $C_1$-$C_{10}$alkyl;
cyclohexylmethyl;
cyclohexylmethyl substituted by 1, 2 or 3 $C_1$-$C_{10}$alkyl;
$C_5$-$C_9$cycloalkenyl,
$C_5$-$C_9$cycloalkenyl substituted by 1, 2 or 3 $C_1$-$C_{10}$alkyl;
phenyl substituted by 1, 2 or 3 radicals selected from the group consisting of $C_1$-$C_{10}$alkyl, $C_1$-$C_{10}$alkyloxy, hydroxy, halogen, trihalogenmethyl, trihalogenmethoxy, benzoyl, phenylamino, acylamino and phenylazo;
$C_7$-$C_9$-phenylalkyl,
$C_7$-$C_9$-phenylalkyl which is substituted on the phenyl by 1, 2 or 3 radicals selected from the group consisting of $C_1$-$C_{10}$alkyl, $C_1$-$C_{10}$alkoxy and hydroxy;
naphthyl,
naphthyl substituted by $C_1$-$C_{10}$alkyl;
adamantyl, or
a 5 to 6 membered heterocyclic group;
or one or more aromatic trisamide compounds of formula IIa, IIb or IIc

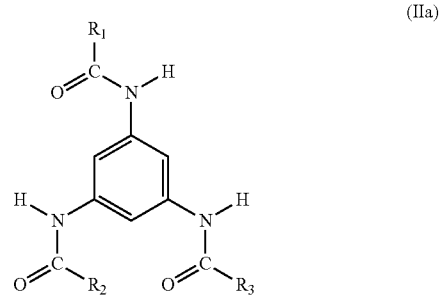

(IIa)

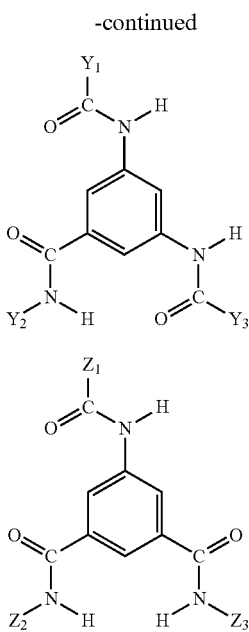

wherein

R₁, R₂ and R₃, or Y₁, Y₂ and Y₃, or Z₁, Z₂ and Z₃ independently of one another are $C_1$-$C_{20}$alkyl unsubstituted or substituted by one or more hydroxy;

$C_2$-$C_{20}$alkenyl unsubstituted or substituted by one or more hydroxy;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

bis[$C_3$-$C_{12}$cycloalkyl]-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

phenylethenyl unsubstituted or substituted by one or more $C_1$-$C_{20}$alkyl;

biphenyl-($C_1$-$C_{10}$alkyl) unsubstituted or substituted by one or more $C_1$-$C_{20}$alkyl;

naphthyl unsubstituted or substituted by one or more $C_1$-$C_{20}$alkyl;

naphthyl-$C_1$-$C_{20}$alkyl unsubstituted or substituted by one or more $C_1$-$C_{20}$alkyl;

naphthoxymethyl unsubstituted or substituted by one or more $C_1$-$C_{20}$alkyl;

biphenylenyl, flourenyl, anthryl;

a 5- to 6-membered heterocyclic radical unsubstituted or substituted by one or more $C_1$-$C_{20}$alkyl;

a $C_1$-$C_{20}$hydrocarbon radical containing one or more halogen; or tri($C_1$-$C_{10}$alkyl)silyl($C_1$-$C_{10}$alkyl);

with the proviso that at least one of the radicals selected from R₁, R₂ and R₃, or Y₁, Y₂ and Y₃, or Z₁, Z₂ and Z₃ is branched $C_3$-$C_{20}$alkyl unsubstituted or substituted by one or more hydroxy;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

biphenyl-($C_1$-$C_{10}$alkyl) unsubstituted or substituted by one or more $C_1$-$C_{20}$alkyl;

naphthyl-$C_1$-$C_{20}$alkyl unsubstituted or substituted by one or more $C_1$-$C_{20}$alkyl; or tri($C_1$-$C_{10}$alkyl)silyl($C_1$-$C_{10}$alkyl)

and subjecting the blend to an electret treatment, where the aromatic trisamide compounds are present from about 0.005 to 0.5% by weight, based on the weight of the thermoplastic polymer and melt blending the thermoplastic polymer with a further additive selected from the group consisting of hydroxyphenylalkylphosphonic esters or monoesters and hindered amine light stabilizers.

12. A method according to claim 11 comprising melt blending the thermoplastic polymer with one or more trisamide compounds of formula I.

13. A method according to claim 11 comprising melt blending the thermoplastic polymer with one or more trisamide compounds of formula IIa, IIb or IIc.

14. A method according to claim 11 in which the thermoplastic polymer is polypropylene.

15. A method according to claim 11 in which the blend is a nonwoven polypropylene web.

16. A method according to claim 11 where in the compounds of formula IIa, IIb and IIc, at least one of the radicals selected from R₁, R₂ and R₃, or Y₁, Y₂ and Y₃, or Z₁, Z₂ and Z₃ is branched $C_3$-$C_{20}$alkyl, or is $C_3$-$C_{12}$cycloalkyl unsubstituted or substituted by one or more $C_1$-$C_{20}$alkyl.

17. A method according to claim 11 where the electret treatment is a corona treatment.

18. A method according to claim 11 which comprises melt blending the thermoplastic polymer with a further additive selected from the group consisting of the hindered amine light stabilizers.

19. A method according to claim 11 which comprises melt blending the thermoplastic polymer with a further additive selected from the group consisting of the hydroxyphenylalkylphosphonic esters or monoesters.

20. A method according to claim 11 where the aromatic trisamides are present from about 0.01 to about 0.09% by weight, based on the weight of the thermoplastic polymer.

21. An electret material according to claim 1 which is in the form of a nonwoven fibrous web.

22. A method according to claim 11, which method further comprises converting the melt blend to a nonwoven fibrous web.

* * * * *